Dec. 2, 1952      L. H. FLORA      2,620,209
ADJUSTABLE ROD JOINT OR THE LIKE
Filed Aug. 29, 1947
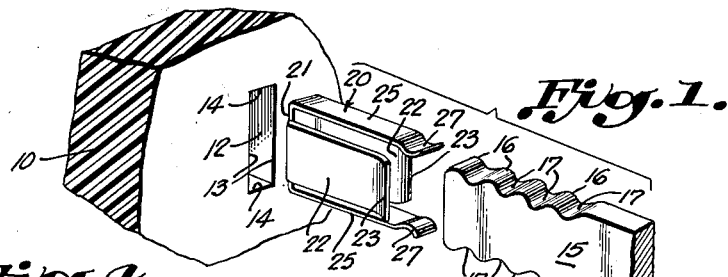
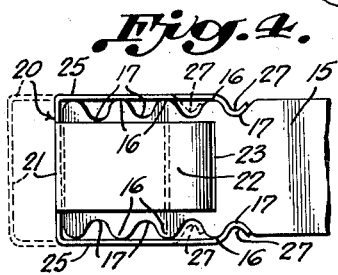
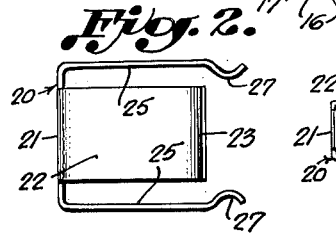
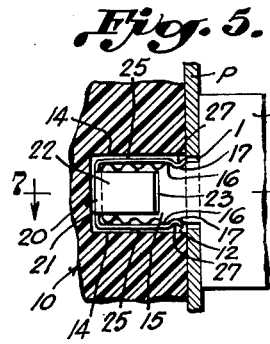
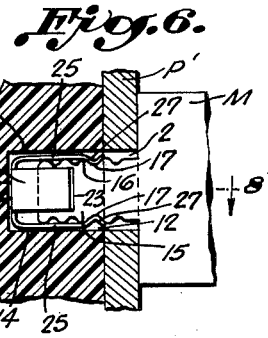
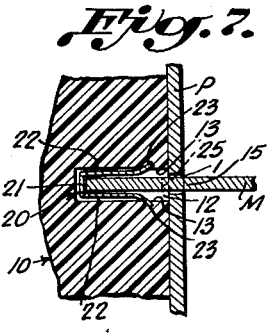
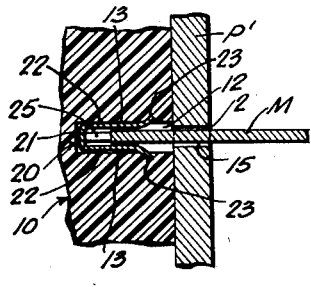
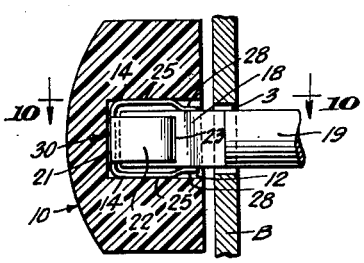
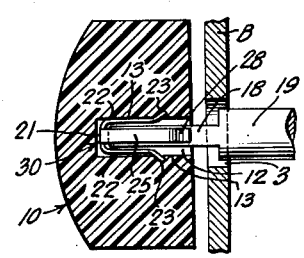
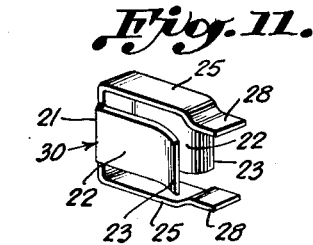
Inventor
LAURENCE H. FLORA
By H. G. Lombard
Attorney Patented Dec. 2, 1952

2,620,209

UNITED STATES PATENT OFFICE 2,620,209

ADJUSTABLE ROD JOINT OR THE LIKE

Laurence H. Flora, Cleveland, Ohio, assignor to Tinnerman Products, Inc., Cleveland, Ohio, a corporation of Ohio Application August 29, 1947, Serial No. 771,255

3 Claims. (Cl. 287—53)

This invention relates, in general, to improvements in fastening installations comprising a member having a projecting connecting stud or shank which is received in a recess in a cooperating member and secured therein against relative axial movement as well as against relative rotative movement in a firm, rigid and resilient joint or connection under continuously effective spring tension.

More particularly, the invention is directed to an improved fastening construction and novel fastener for securing an installation comprising a member having a projecting stud, stem or shank which is received in a recess in a cooperating member, particularly a plastic part or object, and secured therein by a resilient joint or connection which is adapted to absorb the thrust or strain set up in the connected members during the assembly thereof or incidental to the use of the completed installation.

In many installations, particularly those in which the securing of plastic parts is involved, it is often necessary, desirable or expedient to provide one of the members with a flat shank, stem or stud which may be secured in a recess in the cooperating member to complete the joint or connection. Plastic parts are usually relatively fragile and brittle and when provided with a recess for receiving a stud or stem together with anchoring means such as a set screw, or the like, which exerts a more or less localized binding or wedging action between the shank or stud and the wall of the recess, there frequently occurs a splitting or fracture of the plastic part in the assembly of the joint or incidental to strain taking place after a period of use with the result that even though the plastic part is not completely broken, it is so loosely secured that the installation is unsatisfactory and is not an acceptable finished product.

A primary object of the present invention, therefore, is to provide an improved joint or connection which overcomes the foregoing insufficiencies of the prior art devices in the use of a spring holding clip device which is so designed as to serve as a resilient bushing or bearing for supporting and securing the connecting stud or projecting shank on a member in a recess in a cooperating member in such a way that any thrust or strain taking place in the connected parts is effectively absorbed by the spring clip device.

A further object of the invention is to provide such a joint or connection in which the connecting stud is in the form of a flat shank element defined by a projection on a structural member or the free end of a shaft, post, rod, rivet, or the like.

Another object of the invention is to provide a joint or connection such as described in which the flat connecting stud or shank is secured by a clip having a positive locked connection with the shaft.

An additional object of the invention is to provide a joint or connection of this character in which the flat connecting stud or shank is adapted to be secured to the recessed member in different axial positions for adjustment purposes or for use in different installations.

Further objects and advantages of the invention, and other new and useful features in the construction, arrangement and general combination of parts, will be readily apparent as the following description proceeds with reference to the accompanying drawings, for purposes of illustration but not of limitation, in which like reference characters designate like parts throughout, and in which:

Fig. 1 is an exploded perspective view showing the several parts of a joint or connection in accordance with the invention in the relative position thereof for completing the assembly;

Fig. 2 is an enlarged elevational view of the spring clip included in Fig. 1;

Fig. 3 is an enlarged side view of the spring clip shown in Fig. 2;

Fig. 4 is an elevational view showing the clip disclosed in Figs. 1 to 3 inclusive as initially applied to the stud or shank on a member and adapted for adjustable position thereon as illustrated in dotted lines;

Fig. 5 is a sectional view showing a member having a projecting stud or shank secured in a recess in a cooperating member in a resilient joint or connection provided by the spring holding clip;

Fig. 6 is a similar view showing the same general type of resilient joint or connection in which the clip is adjusted for securing an installation of parts of different size and relation;

2,620,209

3

Fig. 7 is a sectional view of Fig. 5 taken along line 7—7, looking in the direction of the arrows;

Fig. 8 is a sectional view of Fig. 6 taken along line 8—8, looking in the direction of the arrows;

Fig. 9 is a sectional view of a further embodiment of the invention in which another form of the clip is employed to provide a separable resilient joint or connection;

Fig. 10 is a sectional view of Fig. 9, taken along line 10—10, looking in the directions of the arrows; and, Fig. 11 is a perspective view of the spring clip per se as shown in Figs. 9 and 10.

The resilient joint or connection of the present invention is one of general utility and is directed primarily to the provision of a simple, inexpensive fastening construction which may be readily embodied in practically any installation comprising a member provided with a recess for receiving a projecting stud or shank on a cooperating member, praticularly when the shank or stud is in the form of a flat strip, stem, or the like.

In general, the invention involves an arrangement whereby a relatively large object or part may be provided at very low cost with means for securing the same to a stud or shank of considerably smaller cross-section by an inexpensive spring holding clip which is received in a simple recess in such part in the manner of a resilient bushing or bearing for embracing the shaft together with means providing a positive connection of the shaft in said recess. Moreover, the plastic part to be secured or mounted in an installation need be provided only in the manner of a conventional plastic object having a simple form of recess in the form of a slot or the like which, of course, greatly facilitates the quantity production of a high grade article at minimum cost inasmuch as only the simplest molding equipment is required. Additionally, the instant resilient joint or connection requires only the use of a simple, inexpensive spring holding clip which is concealed from view in a completed installation and otherwise eliminates expensive and time-consuming drilling, tapping, and broaching operations heretofore necessary in producing similar articles, in addition to dispensing with the use of set screws and special forms of clutch devices for engaging the stud or shank by a binding or wedging action on the shaft. The improved resilient joint or connection of the present invention involves a decided advantage over heretofore known similar constructions in that the spring holding clip is designed to provide a resilient bearing in the recessed member and otherwise define a resilient bushing which is associated with the stud or shank of the cooperating member in such manner as to absorb substantially the entire thrust and strain taking place in the assembly of the joint or connection or incidental to the use of the installation. Thus, there is no localized pressure on any portion of the walls of the recess in the plastic member as would cause a splitting or breaking thereof either in the initial attachment of the connected members or incidental to the use thereof in an installation.

In the drawings, there is shown by way of illustration, an application of the improved resilient joint or connection as employed for mounting a plastic part or other object, designated generally 10, onto a flat stud, stem or shank on a shaft or cooperating part or member which is received in a slot-like recess 12 in the plastic part or other object. Inasmuch as the shank, stud or stem on the shaft or other member is substantially flat,

4 the socket opening in the plastic part is provided in a complementary slot-like recess 12 having side walls 13 and end walls 14 spaced slightly larger than the cross-sectional area of the flat shank or stem on the shaft or other member. The flat stud, stem or shank, designated generally 15, may comprise an integral projection on a part or the free end of a shaft, post, rod, spindle, or the like, and is provided with a series of teeth or abutments along the side edges thereof preferably in the form of uniformily spaced rounded or arcuate projections 16 separated by spaced arcuate notches or indents 17.

The spring holding clip device 20 is of such design as to fit onto the free end of the stud, shank or shaft 15 in positive interlocking relation therewith and to be received within the recess 12 in the plastic part or other object 10, together with means adapted for anchoring engagement with the side walls 13 of said recess under continuous spring tension. The spring clip 20 is constructed of any suitable sheet metal, preferably from a strip of spring steel or cold rolled steel having spring-like characteristics which is readily worked by suitable bending and forming operations to the desired shape and size to be received in the recess 12 in said object in a manner to provide a resilient bushing or bearing for the flat stud, shank or stem 15 of the cooperating part in a completed installation, as presently to be described.

In the form of invention shown in Figs. 1 to 8 inclusive, the spring clip 20 is formed from a simple sheet metal blank defining a base portion 21 carrying a pair of spring arms 22 adapted to embrace opposing flat faces of the stud, stem or shank 15 and which include outwardly flared tongues, prongs or other anchoring means 23 on the extremities thereof. Between said spring arms 22, as seen in Fig. 3, a pair of opposing attaching or retaining elements 25 extend from the base 21 of the clip and are so designed as to clasp the sides of the flat stud or shank. The retaining elements 25 are in the general form of fingers provided on their extremities with arcuate detents or shoulders 27 having a shape corresponding to the series of arcuate indents or notches 17 along the sides of the flat stud or shank 15.

The arcuate detents 27, accordingly, define spaced cooperating shoulder elements which are adapted to be received in the selected pair of opposing indents or notches 17 on the sides of the flat stud or shaft, as illustrated in full and dotted lines in Fig. 4, depending upon the disposition of said shaft in an installation. Thus, by way of example, in an installation in which the flat connecting stud 15 on a plate-like structural member M extends through an opening 1 in a base panel P, substantially as shown in Fig. 5, the cooperating shoulder elements 27 would be received in the innermost pair of notches 17 on the stud, with the stud extending into the full length of the clip. In the event that the disposition or adjustment of said shaft, stud or shank 15 in an installation results in a shorter length of the stud in projecting relation to the panel P' through the opening 2, as shown in Fig. 6, due to the greater thickness of the base panel P', for example, then the cooperating shoulder elements 27 on the spring fingers 25 would be received in the next adjacent pair of opposing notches 17 and the stud or shank 15 would extend into the body of the clip a proportionately less distance. Likewise, in the event that a still shorter length of shaft is available, then the cooperating shoulders 27 on the spring arms 25 would be received in the pair of opposing notches or indents 17 nearer the end of the stud with the stud or shaft received in the body of the clip a proportionately less distance.

From the foregoing, it will be understood that the members comprising the improved joint or connection of the invention are readily assembled and mounted in an installation such as shown in either Figs. 5 and 7, or, Figs. 6 and 8, simply by applying the spring clip 20 to selected position on the projecting free end of the stud, shank or shaft 15, Fig. 4, as represented in full lines for the installation of Figs. 5 and 7 or, in dotted lines for the assembly of Figs. 6 and 8. In any case, the arms 22 of the clip are designed for resilient clasping relation with the flat faces of the stud or shaft 15, and the arcuate shoulders or detents 27 on the extremities of the spring fingers 25 are received in the suitable pair of opposing arcuate indents or notches 17 on the sides of the stud or shaft 15 depending on the available projecting length of said shank or stud. The clip is held in attached, connected relation with the stud or shaft by virtue of the arcuate detents or shoulders 27 in abutting relation with the adjacent pair of projections or abutments 16. The spring arms 22 and the spring fingers 25 otherwise are designed to be easily and quickly snapped into assembled relation with the stud or shaft and be retained thereon in the aforesaid manner under continuously effective spring tension.

The object or part 10 is then connected to the stud or shaft 15 by insertion of the stud and the clip 20 attached thereon into the recess 12 in said object. The object or the stud is pushed axially to move these parts relatively to each other to fully assembled position substantially as shown in Fig. 5 when the clip is initially attached as represented in full lines in Fig. 4. In the event that the clip has been initially applied as represented in dotted lines in Fig. 4, the assembly would be substantially as illustrated in Fig. 6. In any case, in the initial step of assembly, the leading base portion 21 of the clip is readily received in the recess 12, and as the clip is advanced therein the side walls 13 of the recess compress the outwardly flared extremities 23 on the spring arms as necessary for the clip to move to fully attached position in said recess. In such fully assembled position, the tongues, prongs or other anchoring means defined by the outwardly flared extremities 23 on the spring arms are adapted to dig into and become embedded in the side walls 13 of said recess to lock the clip in attached position in the recess against withdrawal as illustrated in Fig. 7 wherein the parts are in the fully attached position shown in Fig. 5. Likewise, Fig. 8 shows the anchoring elements 23 on the extremities of the spring arms embedded in the side walls 13 of the recess with the clip in the initially applied position thereof for securing the assembly illustrated in Fig. 6.

In either case, in the fully assembled position of the joint or connection, the outwardly flared extremities on the spring arms 22 are compressed against the side walls 13 of the recess so that said spring arms are in resilient, gripping, bearing engagement with the flat faces of the shaft 15 in the manner of a resilient bearing or bushing which supports the stud or shaft in such a way as to absorb substantially the entire thrust and strain taking place as a result of torque or turning movements or forces on the part or object 10, or on the shank or stud part 15. In addition, such a resilient bearing or bushing arrangement in a joint or connection of the kind described, is advantageous in that the clip is adapted to be used with any of several sizes of similar studs and otherwise compensate for irregularities and manufacturing variations in the stud or shank. Thus, there is seldom any necessity for special shaping operations of the usual number of studs in a supply of parts which are not of the exact dimensions necessary for a proper fit in the socket opening or recess in the parts to be connected to the studs.

Usually the spring holding clip is first applied to assembled relation on the stud or shank in any selected position as shown in Fig. 4, and the necessary part or object thereafter attached, as aforesaid. In certain instances, it is a more expeditious procedure to apply the spring clip 20 into the slot 12 in the recessed part or member 10 and then apply the stud or shank to the clip to effect a joint or connection substantially the same as that illustrated in Figs. 5 and 7, for example.

Figs. 9, 10 and 11 disclose a further embodiment of the invention which is designed for installations in which it is necessary or desirable that the parts of the resilient joint or connection be separable and removable from the installation as in a mounting for a rotary knob, handle or other operating part or member. Accordingly, in a mounting for a panel knob, for example, the flat stud or shank 18 on the extremity of the shaft, lever or other operating member 19 is of simple, plain formation and extends through a suitable opening 3 in a panel or instrument board B in projecting relation thereto.

The spring holding clip 30 is of the same general character as that described with reference to Figs. 1–8 inclusive and comprises a base 21 carrying a pair of similar spring arms 22 adapted to embrace opposing flat faces of the flat stud or shank 18 on the extremity of the shaft 19. The arms 22 include the outwardly flared tongues, prongs or other anchoring means 23 adapted to dig into and become embedded in the side walls 13 of the object 10, such as a plastic knob or handle, or the like.

Between said spring arms 22, the finger elements 25 extend from the base 21 of the clip and have their extremities offset inwardly toward each other to define flat, resilient pressure lips 28 designed for frictional and gripping engagement with the flat sides of the shaft, stud or shank 18 under continuously effective spring tension.

The members comprising the improved joint or connection in this embodiment of the invention are readily assembled and mounted in the installation shown in Figs. 9 and 10 in the same general manner described with reference to Figs. 1 to 8 inclusive. The spring arms 22 and the spring fingers 25 are applied to clasp the flat faces and sides, respectively, of the free end of the shaft or stud 18 in the manner of a tubular thimble or the like. The knob, handle or other object 10 is then connected to the shaft simply by inserting the stud 18 and the clip 30 attached thereon into the recess 12 in said object and pushing the object to the fully assembled position of the joint or connection substantially as shown in Figs. 9 and 10. In the initial step of assembly, the leading base portion 21 of the clip is readily received in the recess 12 in the knob, and as the clip is advanced therein, the side walls 12 of the recess compress the outwardly flared extremities 23 on the spring arms as necessary for the clip to move to fully attached position in said recess with the tongues, prongs, or other anchoring means defined by the outwardly flared extremities 23 on the spring arms adapted to dig into and become embedded in the side walls 13 of said recess to lock the clip in attached position in the recess against withdrawal as illustrated in Fig. 10. At the same time the spring fingers 25 are compressed against the end walls 14 of the recess 12 and thereby force the pressure lips 28 on the extremities thereof into frictional gripping relation with the sides of the shaft as shown in Fig. 9. Accordingly, it will be understood that the spring arms 22 and the spring fingers 25 in this form of invention define a resilient bearing or bushing which supports the flat stud or shaft 15 in such a way as to absorb substantially the entire thrust and strain taking place on turning movements of the knob, handle or other object 19, Figs. 9 and 10. Such a resilient bearing or bushing arrangement is also advantageous in that the clip is adapted to be used with any of several sizes of similar flat studs 18 and otherwise compensate for irregularities and manufacturing variations in the stud or shank.

It is to be noted that the resilient joint or connection of the invention, in either embodiment, involves a most simple and inexpensive construction, making for a highly practical form of connecting arrangement by which a knob or any other article of manufacture may be easily and quickly secured onto a shaft, or the like, under continuously effective spring tension against relative rotative as well as relative axial movement.

It will be further appreciated that the improved joint or connection of the invention is such as to be especially suited for use with articles formed of plastic compositions and other fragile materials inasmuch as the spring holding clip is so designed as to take practically the entire thrust and strain set up by the stud, shank or shaft thereby practically eliminating any tendency of splitting or breaking of the plastic knob, handle or other part.

Though the description and drawings refer to the invention as incorporated in a panel knob or handle, for example, it will be understood that the improved joint or connection is one of general utility which is equally applicable wherever any article of manufacture is to be secured to a connecting stud, shank, shaft, rod, spindle, etc., or in any installation in which an operating member is to be mounted by sliding over the end of a shaft or applied to a shaft stem to effect axial movements thereto or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A rod joint, or the like, comprising a member having a recess and a shaft having an end portion assembled in said recess, said end portion of the shaft having a cross section conforming to but slightly smaller than said recess and being notched to provide a series of substantially arcuate abutments on said end portion of the shaft, and a fastener fitted over said end portion of the shaft and completely surrounded by the wall of said recess in assembled relation in said recess, said fastener comprising a one-piece sheet metal device bent to define a base and a pair of spaced arms extending from said base, said spaced arms receiving said end portion of the shaft and having means engaging the wall of said recess to anchor the fastener in said recess, and a spring finger also extending from said fastener base and having a substantially arcuate shoulder in surface engagement with one of said series of substantially arcuate abutments on said end portion of the shaft in any of several different positions of assembly of said end portion of the shaft in said recess.

2. A rod joint, or the like, comprising a member having a recess of generally rectangular cross section and a shaft having a flat end portion assembled in said recess, said flat end portion of the shaft having a cross section conforming to but slightly smaller than said recess and being provided with a series of substantially arcuate abutments on an edge of said flat end portion of the shaft, and a fastener fitted over said flat end portion of the shaft and completely surrounded by the wall of said recess in assembled relation in said recess, said fastener comprising a one-piece sheet metal device bent to define a base and a pair of spaced arms extending from said base, said spaced arms receiving said flat end portion of the shaft and having means engaging the wall of said recess to anchor the fastener in said recess, and a spring finger also extending from said fastener base between said spaced arms and having a substantially arcuate shoulder in surface engagement with one of said series of substantially arcuate abutments on the edge of said flat end portion of the shaft in any of several different positions of assembly of said flat end portion of the shaft in said recess.

3. A rod joint, or the like, comprising a member having a recess of generally rectangular cross section and a shaft having a flat end portion assembled in said recess, said flat end portion of the shaft having a cross section conforming to but slightly smaller than said recess and being notched on each edge to provide a series of pairs of substantially arcuate abutments on said flat end portion of the shaft, and a fastener fitted over said flat end portion of the shaft and completely surrounded by the wall of said recess in assembled relation in said recess, said fastener comprising a one-piece sheet metal device bent to define a base and a pair of spaced arms extending from said base, said spaced arms receiving said flat end portion of the shaft and having means engaging the wall of said recess to anchor the fastener in said recess, and a pair of spring fingers also extending from said fastener base between said spaced arms and having substantially arcuate shoulders in surface engagement with one of said pairs of substantially arcuate abutments on said flat end portion of the shaft in any of several different positions of assembly of said flat end portion of the shaft in said recess.

LAURENCE H. FLORA.

REFERENCES CITED

The following references are of record in the file of this patent:

UNITED STATES PATENTS

| Number | Name | Date |
|---|---|---|
| 920,044 | Favreau | Apr. 27, 1909 |
| 1,171,914 | Wright | Feb. 15, 1916 |
| 1,909,353 | Hughes et al. | May 16, 1933 |
| 1,911,916 | Menamin | May 30, 1933 |
| 1,931,695 | Hall | Oct. 24, 1933 |
| 2,117,832 | Wellner | May 17, 1938 |
| 2,149,665 | Box | Mar. 7, 1939 |
| 2,169,691 | Hammer | Apr. 15, 1939 |
| 2,271,266 | Kost | Jan. 27, 1942 |
| 2,415,180 | John | Feb. 4, 1947 |
| 2,455,236 | Darvie et al. | Nov. 30, 1948 |
| 2,528,675 | Tinnerman | Nov. 7, 1950 |
| 2,574,330 | Judd | Nov. 6, 1951 |